United States Patent [19]

O'Connell

[11] Patent Number: 4,466,020

[45] Date of Patent: Aug. 14, 1984

[54] INTEGRATED IMAGING BAR

[75] Inventor: Patrick A. O'Connell, Fremont, Calif.

[73] Assignee: Xerox Corporation, Stamford, Conn.

[21] Appl. No.: 408,110

[22] Filed: Aug. 16, 1982

[30] Foreign Application Priority Data

Aug. 17, 1981 [GB] United Kingdom ............... 8125080

[51] Int. Cl.$^3$ ............................................. H04N 1/24
[52] U.S. Cl. .................... 358/293; 358/286; 358/294; 358/300
[58] Field of Search ............ 358/285, 286, 293, 294, 358/213, 241, 256, 300

[56] References Cited

U.S. PATENT DOCUMENTS

| | | | |
|---|---|---|---|
| 3,205,302 | 9/1965 | Quade | 358/285 |
| 3,318,996 | 5/1967 | Garfield | 358/300 |
| 3,409,899 | 11/1968 | Cowan | 346/153.1 |
| 4,257,071 | 3/1981 | Lamb | 358/286 |
| 4,271,435 | 6/1981 | Tarenouchi | 358/213 |

Primary Examiner—Howard W. Britton
Attorney, Agent, or Firm—W. Douglas Carothers, Jr.

[57] ABSTRACT

An integrated image bar comprises an array of photosensitive reading elements and an array of associated marking elements, one for each reading element. Each reading element is linked to its associated marking element by means of an integrated circuit which comprises a plurality of thin film or MOS transistor amplifiers. In this manner, the reading elements, marking elements and amplifier circuits may be produced in a compact and inexpensive integrated structure. The integrated image bar may be used for copying documents, as well as for reading documents and for transmitting the information read to another integrated image bar, and for producing a combined record of information received from another remote image bar or remote data source for inclusion with the information read by the subject image bar.

9 Claims, 9 Drawing Figures

INTEGRATED IMAGING BAR

BACKGROUND OF THE INVENTION

This invention relates to an imaging bar which includes an array of photosensitive reading elements and an array of associated marking elements, one for each reading element. All of the reading elements, marking elements, and circuits are carried as an integrated structure.

An image bar comprises a linear array of photosensors, such as photoresistors, coupled electrically to a parallel array of marking elements, such as styli. All of the sets of photosensors and marking elements, together with their associated coupling circuits, operate individually, simultaneously, in parallel. A device of this kind may be used as a copier element by exposing the photosensor array to an illuminated line image of an original, and by scanning with either the image or with the image bar to provide a line-by-line scan of an original document. The ouput side of the image bar may simultaneously write a line-by-line charge image on to a suitable receptor or recording medium to either cause direct coloration in correspondence with the original document or to provide a latent image of the original document for subsequent development.

An example of an image bar of this kind, employed as a copier element, is disclosed in U.S. Pat. No. 3,409,899 to Cowan et al and suggested in FIG. 6 of U.S. Pat. No. 4,257,071 to Lamb. Also, Pat. No. 4,271,435 to Takenouchi et al discloses a readout head that includes a combined array of lenses and aligned photosensitive elements to read an original document.

Cowan et al discloses an image bar comprising an array of photoresponsive elements comprising cadmium sulfide, deposited on one end of a support or substrate and an array of writing stylus deposited at the other end of the support with a voltage divider circuit arrangement for electrically coupling the photoresponsive elements and the writing stylus. The voltage supply, photoresponsive elements and the circuit arrangement are all operated at high voltages, e.g., above 200 volts, and provide high voltage directly to the sytlus for writing.

The problem with such an image bar is basically two fold. First, the photosensitive materials, employed, e.g., cadmium sulfide, require high levels of illumination for practical copying purposes and the levels of illumination required are much larger than those presently required for conventional copiers, e.g., xerographic copiers. Secondly, the circuitry employed in the image bar is all at high operating voltages. High voltages place limitations on the circuit elements that are employed and necessarily leads to increased costs. With the addition of switching elements necessary to supply high voltages to switching elements that supply high voltages to marking or writing elements, these circuit components, whether supplied as discrete components or as an integrated circuit as in Cowan et al, are costly to manufacture, bring about large amount of power dissipation and increase chance of high voltage shorting between circuit elements and present undesirable dangers to the safety of user personnel.

It is the primary objective of this invention to overcome these drawbacks concerning high illumination and voltage requirements in an image bar while applying present thin film or MOS/VLSI technology to provide a low cost and compact integrated image bar having an integral image reading and writing section for respectively reading an original document and immediately creating an image of the document.

SUMMARY OF THE INVENTION

According to this invention, an integrated image bar comprises an array of photosensitive reading elements and an array of associated marking elements, one for each reading element. Each reading element is linked to its associated marking element by means of an integrated circuit which comprises a plurality of transistor amplifiers to provide a low voltage signal proportional to the exposure and a change in impedance of an associated photosensitive reading element is operative to provide a comparatively high voltage to an associated writing stylus. The photosensitive reading element may comprise a photoresistor or a combination charged node and photodiode either of which may be fabricated in thin film or MOS/VLSI circuitry.

A principal advantage gained by this invention is the employment of an amplification effect with integrated circuitry for the particular read/write application disclosed. This effect reduces by many fold the power requirements for a ROS printer/plotter or copier system not previously realized or achievable in the present state of the art. The amplification effect permits the use of a very low level of illumination as compared to such present state of the art systems which require high levels of illumination as well as an accompanying high voltage power source. A low level illumination source may be employed because the electrical gain or power achieved by employing the amplification effect may be as much as from 100 to 1000 times improved over the power level of the chosen photosensitive reading element.

The integrated image bar includes an optical assembly and an integrated circuit assembly formed on a single support. The operating circuitry is fabricated by integrated circuit technology on an appropriate substrate to form the latter mentioned assembly. An optical assembly comprising an array of selfocus lenses is secured to the support in a manner so that the focal point of the array input to the lenses is across the width of a platen for reading a document and the focal point of the array output from the lenses is across the width of the phtosensitive reading elements position on the substrate. The lens array output may be reflected at an angle onto the reading element array or the reading element array may be aligned to be in the optical path of lens array output.

Particularly useful circuit elements for the amplifiers are thin film transistors. The use of thin film transistor amplifiers allows the fabrication of the photosensors, amplifiers and styli in a compatible technology, giving rise to a low cost unit with sufficient amplification that the illumination requirement can be reduced well below that necessary with conventional copiers. This enables the design of a low cost, low power, portable copier.

Other objects and attainments together with a fuller understanding of the invention will become apparent and appreciated by referring to the following description and claims taken in conjunction with the accompanying drawings.

DESCRIPTION OF THE INVENTION

Figure 1:
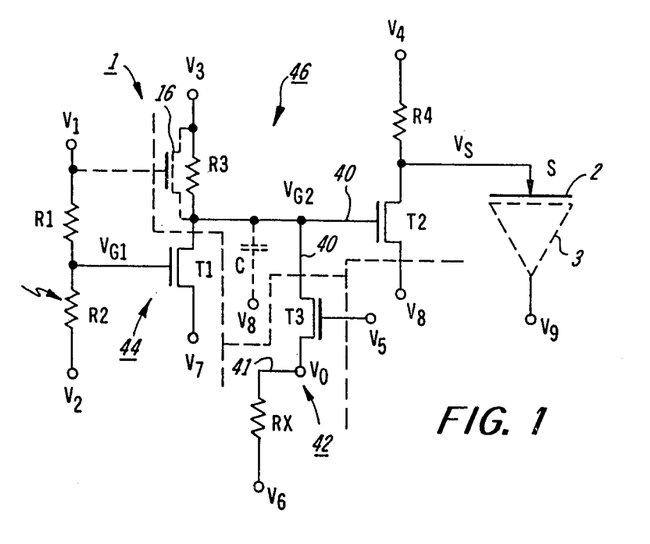
FIG. 1 is a circuit diagram of one section of an image bar in accordance with the invention comprising a photosensitive reading circuit portion and marking element circuit portion and includes an input/output interface circuit portion for communication with a remote storage device or transfer to a remote image bar.

Referring to FIG. 1, the circuit 1 shown represents the circuitry interposed between a photosensor or photosensitive reading element in the form of a photoresistor $R_2$ and a marking element in the form of a stylus or electrode S. The circuit represents only one such section of the integrated circuit assembly for the integrated image bar, as circuit 1 is repeated as many times as there are photosensors and styli comprising the full width of the image bar, for example, on the order of 3000 such sections to cover a standard A4 page width. The circuit 1 may be thought of as separated into three portions which are an input/output interface circuit portion 42, a photosensitive reading element portion 44 and a marking element portion 46.

The stylus S is representative of conventional electrographic printers wherein, based upon the voltage potential established between the stylus S and backing electrode structure, represented by the dashed line triangle 3, a discharge is produced at stylus S forming a deposited charge on the recording medium 2. The voltage potential difference between $V_4$ and $V_9$ is typically 350 volts or more to bring about such a charge deposition. In order to obtain deposition, a discharge or breakdown must occur between the stylus and the backing electrodes. $V_9$ may also have a pulsed waveform to initiate as well as extinguish breakdown. Of course, the voltage requirements depend upon the geometry of the stylus and backup electrode, the type of recording medium and environmental conditions, such as, humidity. The backup electrode 3, for example, may be either a U-shaped channel member, a conductive plate or a resistive strip material having a predetermined sheet resistivity.

Figure 1A:
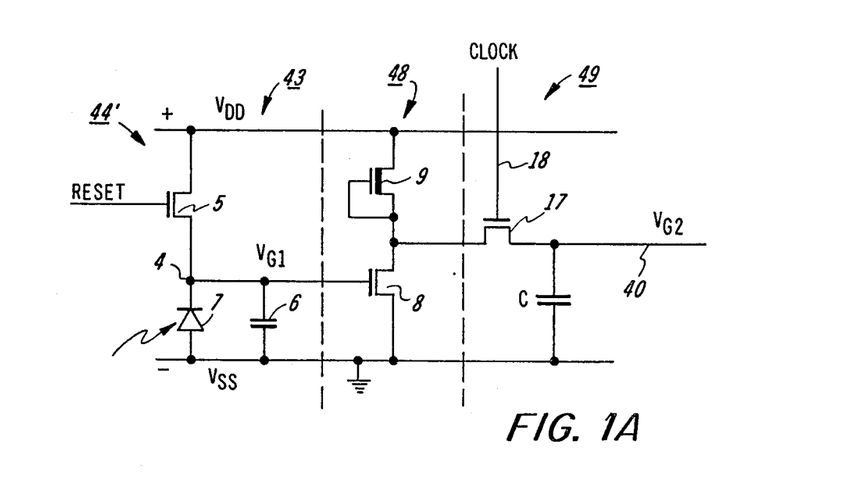
FIG. 1A is a circuit diagram for an alternative embodiment for the photosensitive reading circuit portion of FIG. 1.

The circuits of FIGS. 1 and 1A may be formed with integrated circuit technology such as, NMOS, PMOS, CMOS, bipolar or TFT technology, e.g., laser recrystallization.

Circuit 1 includes three transistors T1, T2 and T3, and four resistors $R_1$ to $R_4$. $R_3$ is a bias resistor for a first stage amplifier (T1) and with circuit capacitance C, which is shown in dotted configuration in FIG. 1, provides a storage capability for a signal $V_{G2}$ between the two stages of the amplifier $R_3$ may be substituted by a transistor 16, shown in dotted line configuration in FIG. 1, with a suitable gate control, for example from $V_1$. Transistor 16 provides a longer storage time without changing the value of C, i.e., the signal $V_{G2}$ may be held for a longer period of time since the charge on capacitor C will be isolated by transistor 16 substituted for $R_3$ and act as a dynamic node. Also, when reading in data signals from interface circuit portion 42 along with data signals from the photosensitive reading element portion 44, the gate of transistor 16 would be biased to place the transistor in its conducting state.

For use of the integrated image bar in a direct copying mode of an original document, a two-stage amplifier incorporating thin film transistors T1 and T2 is used, the first stage (T1) being a low-voltage, high gain stage, and the second stage (T2) being a high-voltage but relatively low gain stage. The first stage T1 may be a dual gate transistor to provide for faster response time and higher gain. The second gate $G_2$ is illustrated as a dotted line in the thin film representation of the circuit 1 in FIG. 3.

With $V_1$ and $V_3$ set at a fixed low voltage $V_{LT}$, with $V_2$, $V_5$, $V_7$ and $V_8$ set at zero volts, and with $V_4$ set at a relatively high voltage $V_{HT}$, the circuit is ready for direct copying of an original document. If no light falls on photoresistor $R_2$, due to a reading from a black portion of the original document to be copied, then the voltage $V_{G1}$ at the base of transistor T1 is substantially $V_{LT}$ since the resistance of $R_2$ is high. If light falls on the photoresistor $R_2$ due to a reading from a white portion of the original document, the resistance of photoresistor $R_2$ decreases, and $V_{G1}$ falls to substantially zero.

With $V_{G1}$ at $V_{LT}$ (black), transistor T1 will be conducting connecting $V_3$ to $V_7$ or ground so that the voltage $V_{G2}$ on line 40 at the output of transistor T1 is substantially zero and, therefore, transistor T2 will be nonconductive. As a result, a voltage of from $V_{HT}$, from $V_4$ appears at the stylus S, i.e., $V_5$ is substantially equal to $V_{HT}$. With $V_{G1}$ at zero (white), transistor T1 will be nonconducting so that the voltage $V_{G2}$ on line 40 at the output of transistor T1 is substantially $V_{LT}$ from $V_3$, and therefore, transistor T2 becomes conductive. This lowers the voltage $V_5$ of the stylus S to substantially zero since $V_4$ is connected to $V_8$ or ground. As a result, no output or discharge can be produced at stylus S.

From the foregoing description, it should be clear to those skilled in the art that the logical sense of the photosensitive portion 44 may be opposite to that explained, e.g., the position of $R_1$ nd $R_2$ may be reversed or the voltage sense of $V_1$ and $V_2$ may be reversed. Also, the voltage polarities and their usage scheme for writing may be reversed.

In addition to providing a direct copying capability, the circuit 1 enables information from an image bar at a remote location to be read out, as well as enabling information to be sent to a remote image bar. These read-out and write-in capabilities may be used alone, or in combination with copying, thereby allowing electronic forms overlay techniques to be used, as well as editing to be accomplished. Interfacing between image bar circuits is achieved by way of transistor T3, which acts as a bidirectional series gate. Further detail with regard to circuit portion 42 will be explained later relative to FIG. 5.

Figure 1B:
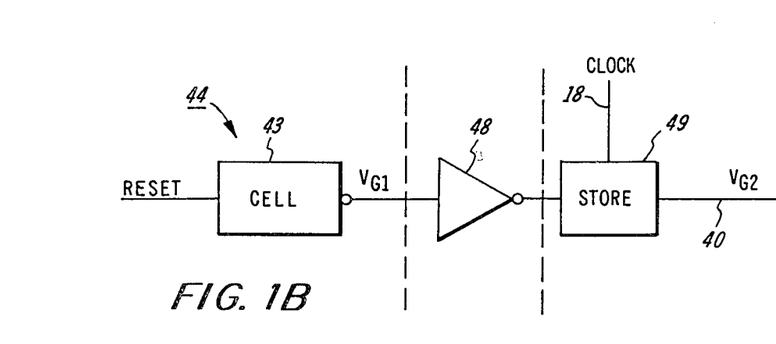
FIG. 1B is a simple logic diagram for the circuit portion shown in FIG. 1A.

FIGS. 1A and 1B disclose an alternative implementation for the photosensitive reading element portion 44. The circuit portion 44' of FIG. 1A comprises light sensing cell 43 having a dynamic node 4. Node 4 is a circuit node which is isolated from $V_{DD}$ by low impedance transistor 5 and normally is capable of holding its voltage level for long periods due to its capacitance to ground represented at 6. The photodiode 7 represents the light detecting properties of the cell 43 and is connected to ground or a negative bias, $V_{SS}$. As implemented in NMOS, when light strikes the area of the integrated circuit represented by the cell 43, the photons become converted into electron-hole pairs with some reasonable quantum efficiency. The holes are generally attracted to a negative biased p-type silicon substrate while the electrons are attracted into n-type diffusion source/drain regions and channel regions. Thus, light is detected by collecting negative charge or electrons. Node 4 is said to be a "dynamic node" because it is isolated from $V_{DD}$. A dynamic node that has been charged to a positive voltage via $V_{DD}$ will "leak" to a lower voltage $V_{SS}$ as light is received on the cell.

Operation of the cell 43 is as follows. When RESET is high or "1", transistor 5 is on and $V_{DD}$ charges the dynamic node 36. When RESET is low or "0", transistor 5 is off and the charged node 36 is isolated from $V_{DD}$. Photo diode 7 is sensitive to light reflected from a white portion of a document causing it to collect negative charge as previously explained. As a result, there will be a sufficiently quick decrease of voltage at node 4.

The decline of voltage at node 4 may be monitored by employing an inverter circuit 48, represented by transistors 8 and 9, to sense the voltage of node 4 and communicate it as an output to store 49 and to $V_{G2}$ on line 40. Inverter 48 provides the complement such that, upon each RESET and charging of the dynamic node 4, the output of inverter 48 will start low and then rise quickly toward a higher voltage as the dynamic node 4 goes quickly low due to the detection of light and depletion of positive charge across the diode 7. Store 49 includes transistor 17 for connecting the output of inverter 48 for storage of this output on capacitor C connected between line 40 and $V_{SS}$. Signal storage is accomplished by a clocking signal on line 18 to the gate of transistor 17.

FIG. 1B is a schematic diagram of the circuit portion 44' comprising a light sensing cell 43 reset by a RESET input and coupled to inverter 48. When no light falls on photodiode 7, due to a reading from a black portion of the original document to be copied, $V_{G1}$ to the input of inverter 48 is high or "1". As a result, its output $V_{G2}$ is low or "0" so that $V_S$ substantially equals $V_{HT}$. When light falls on photodiode 7, due to reading a white portion of an original document to be copied, $V_{G1}$ to the input of inverter 48 is low or "0". As a result, its output is high or $V_{LT}$ so that $V_S$ is substantially close to zero and no mark or discharge will occur at stylus S.

The mode of operation of circuit 1 of FIG. 1 is determined by the set of voltage $V_1$ to $V_6$. The following Table I shows the operating conditions for the circuit 1. $V_7$ and $V_8$ are at zero volts throughout. In the read-out mode, output information appears at $V_0$, and in the write-out mode, data is inputted at $V_0$. $Z_0$ represents the impedance of the output of the tri-state buffer 14, which is explained in further detail relative to FIG. 5.

TABLE I

| OPERATING CONDITIONS FOR CIRCUIT 1 WITH PORTION 44 | | | | | | | | | | |
|---|---|---|---|---|---|---|---|---|---|---|
| Mode and Condition | $V_1$ | $V_2$ | $V_3$ | $V_4$ | $V_5$ | $V_6$ | $V_{G1}$ | $V_{G2}$ | $V_S$ | $V_0$ | $Z_0$ |
| Copying | | | | | | | | | | | |
| Black | $V_{LT}$ | 0 | $V_{LT}$ | $V_{HT}$ | 0 | X | $V_{LT}$ | 0 | $V_{HT}$ | X | X |
| White | | | | | | | 0 | $V_{LT}$ | 0 | | |
| Read-Out | | | | | | | | | | | |
| Black | $V_{LT}$ | 0 | $V_{LT}$ | X | $V_{LT}$ | $V_{LT}$ | $V_{LT}$ | 0 | 0 | X | HI |
| White | | | | | | | 0 | $V_{LT}$ | $V_{LT}$ | | |
| Inhibit | | | | 0 | $V_{LT}$ | | | | $V_{LT}$ | | |
| Write-In | | | | | | | | | | | |
| Black | 0 | 0 | $V_{LT}$ | $V_{HT}$ | $V_{LT}$ | Data | 0 | 0 | $V_{HT}$ | 0 | LO |
| White | | | | | | | $V_{LT}$ | 0 | $V_{LT}$ | | |
| Inhibit | | | | | 0 | $V_{LT}$ | | | $V_{LT}$ | $V_{LT}$ | |
| Mixed Copying & Read-Out | $V_{LT}$ | 0 | $V_{LT}$ | $V_{HT}$ | $V_{LT}$ | $V_{LT}$ | | | | | HI |
| Mixed Copying & Write-In | $V_{LT}$ | 0 | $V_{LT}$ | $V_{HT}$ | $V_{LT}$ | Data | | | | | LO |

In Table I, $V_{LT}$ might be several volts while $V_{HT}$ may be several hundred volts. X designates a "don't care" situation.

Table II shows the operating conditions for copying when circuit portion 44' is substituted for circuit portion 44 of FIG. 1.

TABLE II

| OPERATING CONDITIONS FOR CIRCUIT 1 WITH PORTION 44' | | | | | | | | | |
|---|---|---|---|---|---|---|---|---|---|
| Mode and Condition | $V_1$ | $V_2$ | $V_3$ | $V_4$ | $V_5$ | $V_6$ | $V_{G1}$ | $V_{G2}$ | $V_S$ |
| Copying | | | | | | | | | |
| Black | $V_{DD}$ | $V_{SS}$ | $V_{DD}$ | $V_{HT}$ | $V_{SS}$ | X | $V_{DD}$ | 0 | $V_{HT}$ |
| White | | | | | | | 0 | $V_{DD}$ | 0 |

Conditions for "Read-Out", "Write-In", "Mixed Copying and Read-out" and "Mixed Copying and Write-In" relative to the employment of circuit portion 44' would be the same as in Table I except that $V_2$ would be equal to $V_{SS}$, as opposed to zero, and $V_1$ in the case of "Write-In" would be high.

Figure 2:
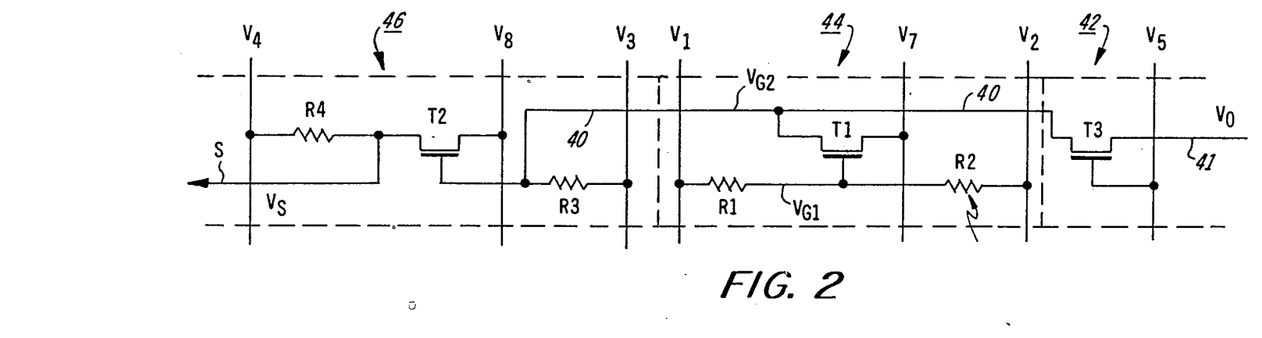
FIG. 2 is an equivalent circuit diagram of the circuit shown in FIG. 1 to conform with the integrated circuit layout shown in FIGS. 3 and 4.
Figure 3:
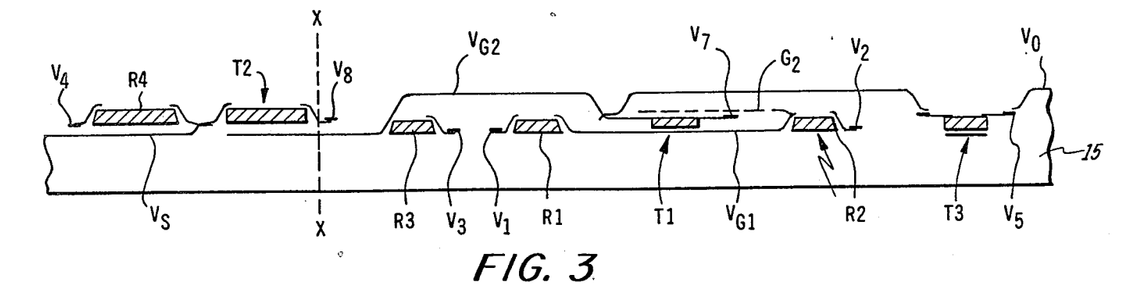
FIG. 3 is a side view of a portion of the integrated image bar according to this invention.
Figure 4:
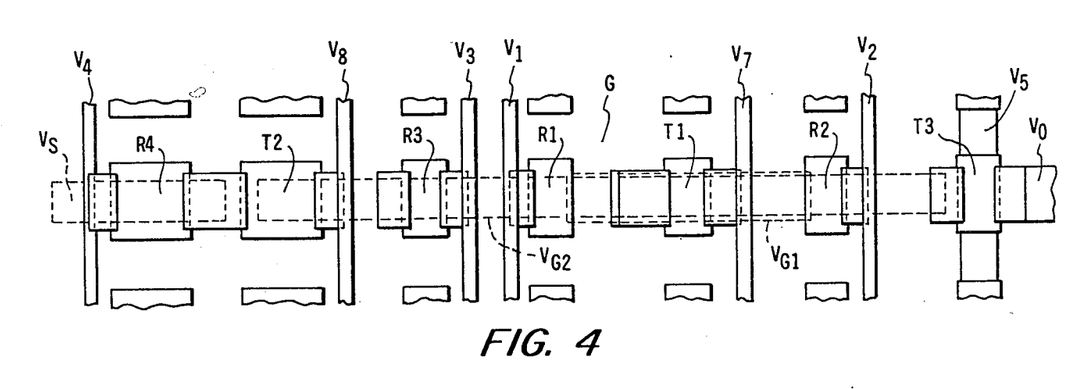
FIG. 4 is a plan view of the integrated image bar portion shown in FIG. 3.

A thin film circuit representation of circuit 1 is shown in FIGS. 3 and 4 while the equivalent circuit layout is shown in FIG. 2. FIG. 2 shows the circuit elements of FIG. 1 re-arranged to correspond physically with the integrated circuit layout of FIGS. 3 and 4. The circuit elements, including thin film transistors T1, T2 and T3, are deposited by thin film techniques, e.g., laser recrystallized silicon thin films, on a substrate 15, e.g., a glass substrate, and a succession of circuits are laid out side by side with common lines for fixed voltages $V_1$ to $V_5$ and $V_7$ and $V_8$ running transversely through all the circuits as best seen in FIG. 4. Each circuit has its own stylus output line for voltage $V_S$, its own interfacing line for voltage $V_0$, and its own photoresistor $R_2$. The photoresistor $R_2$ of each circuit is illuminated from below through the glass substrate. Neighboring components, e.g., transistors T1 and T3, are shielded by the metallization required to form the conductive interconnection, and are thus protected from photo-generated leakage by stray light. The amplifiers drive all the styli S in parallel and, therefore, present a continuous drive voltage at the stylus nibs when transistor T2 is not in its conducting state.

Since short pulses may be normally involved, the storage capacitor C, shown in dotted configuration in FIG. 1, can be easily integrated within the amplifier by lengthening the bar at X—X in FIG. 3 where the $V_{G2}$ line runs beneath the $V_8$ line. The provision of capacitor C makes possible theshort time storage of data supplied from $V_0$ via the gate transistors T3.

Figure 5A:
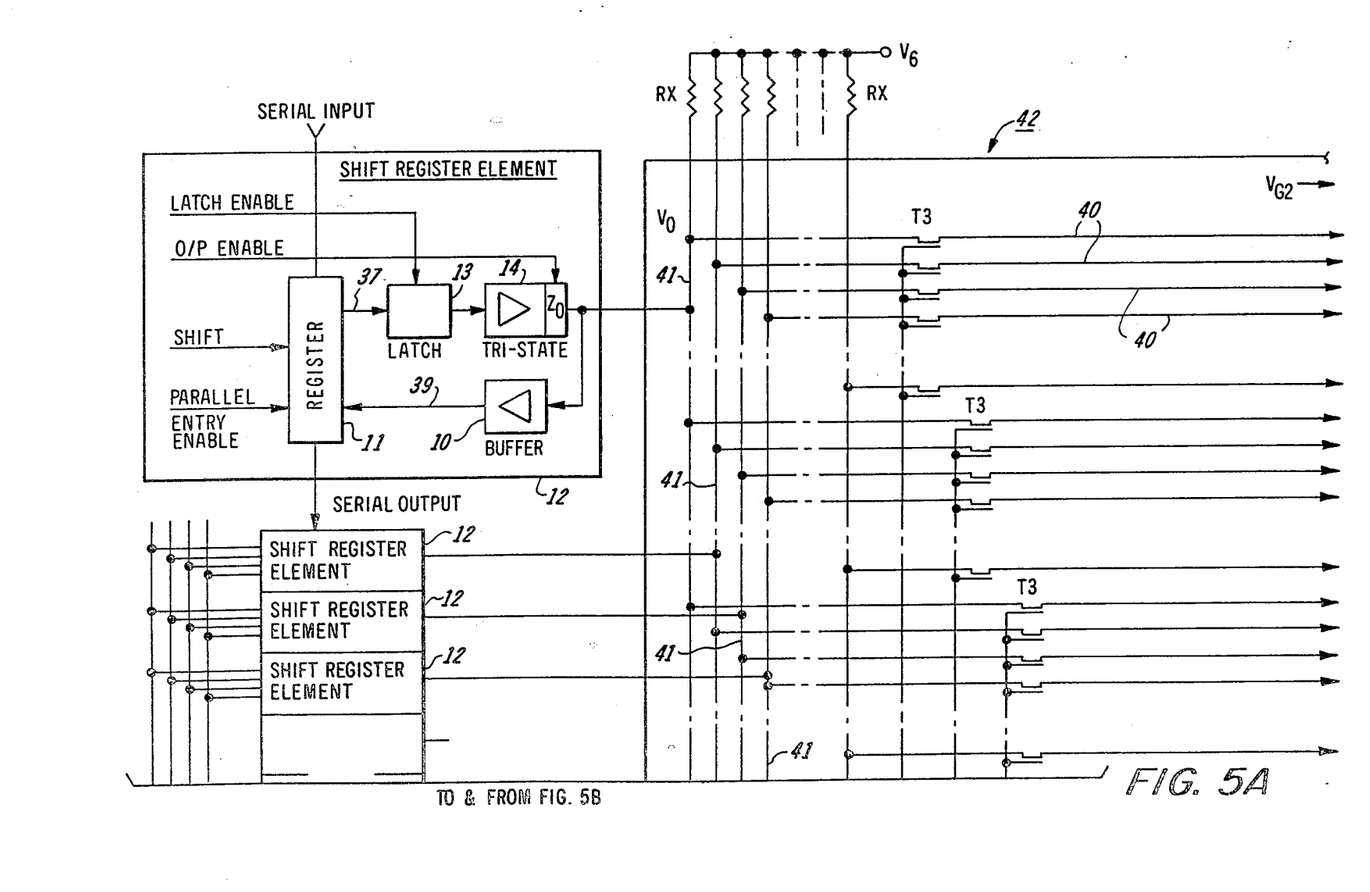
FIG. 5 is a schematic circuit diagram of an input/output interface circuit portion and control circuit for the integrated image bar of FIGS. 1 to 4.
Figure 5B:
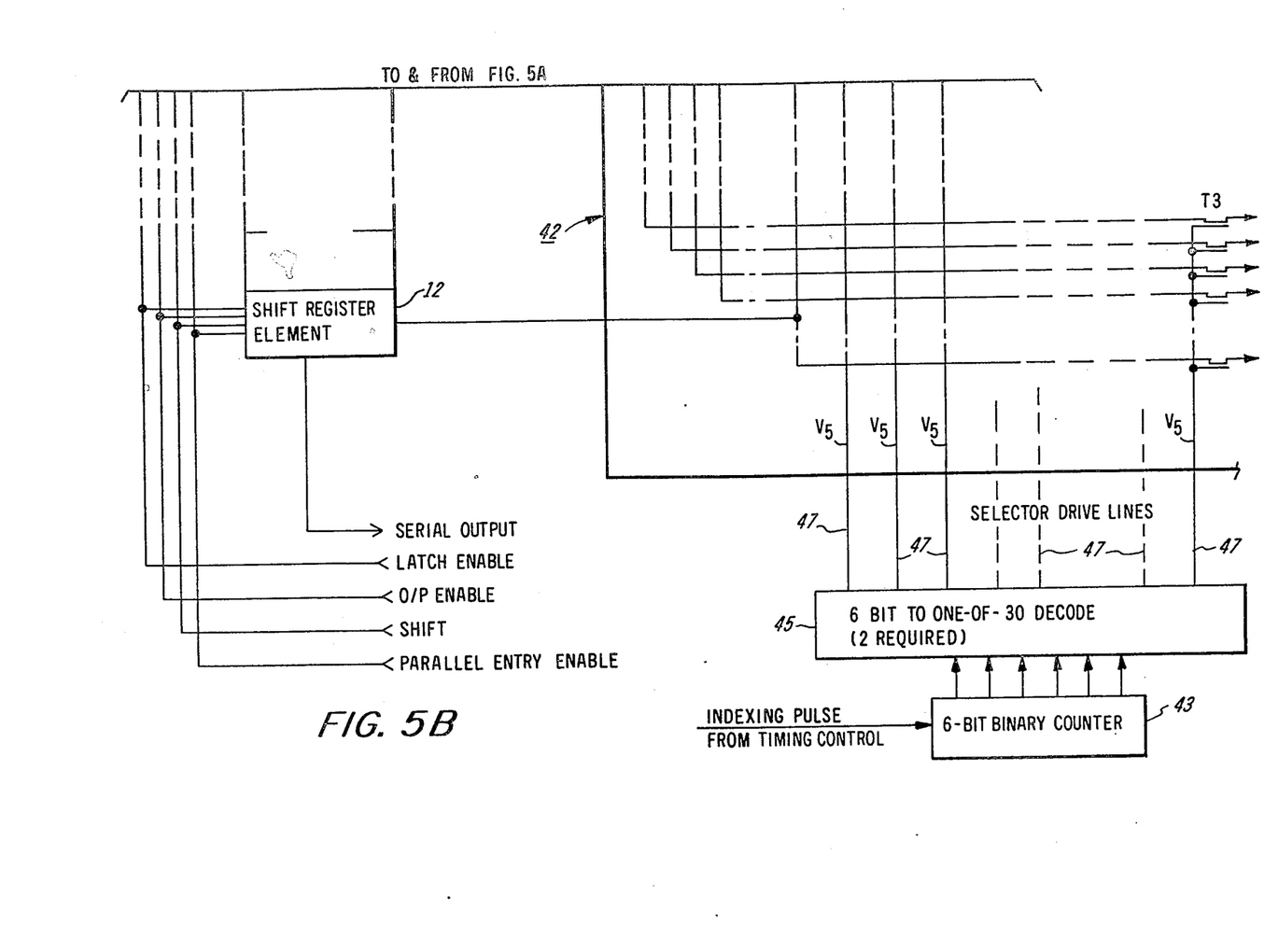

Suitable electronic interfacing circuit 42 for utilizing the read-out and write-in capabilities of the integrated image bar is shown in FIG. 5. Thin film transistor T3 acts as bidirectional series gate, and the load impedances $R_x$ provide bias from the source $V_6$ to reference lines 41 to a quiescent state.

FIG. 5 shows a multiplexing scheme that may be employed in conjunction with the interfacing circuit 42 for read-out and write-in situations. Groups of gate transistors T3 are coupled together to one of a plurality of shift register elements 12. Each shift register element 12 has four inputs, LATCH ENABLE, O/P ENABLE, SHIFT and PARALLEL ENTRY ENABLE. As will be seen, the input, LATCH ENABLE, enables latch 13 which acts as a buffer for data signals from serial register 11. The input, SHIFT, enables data shift through all the shift register elements 12 via their respective shift registers 11 from SERIAL INPUT to SERIAL OUTPUT. The output, O/P ENABLE enables and disenables the tri-state buffer 14. When O/P ENABLE is high, the tri-state buffer 14 has at its output an impedance $Z_0$ which is low and enables the passage of a data signal onto line 41 from latch 13. When O/P ENABLE is low, an impedance $Z_0$, which is high, is present at its output so that any data signal on line 41 is only presentable to the input of buffer 10. The input, PARALLEL ENTRY ENABLE permits the simultaneous input of all registers 11 from the output of their associated buffers 10.

SERIAL INPUT receives data signals from an appropriate data source, e.g., another remote image bar or storage device, and these signals are shifted through registers 11 by enabling signals via the input SHIFT. The output of each of the registers 11 is buffered via latches 13. Upon application of LATCH ENABLE, with O/P ENABLE high thereby enabling $Z_0$ to be at a low impedance state for the tri-state buffer 14, the data signals are provided as output in parallel from the latches 13 onto lines 41. Because of the low impedance state of buffers 14, $V_{G2}$ is overwritten by the data signals provided from latches 13 when the associated transistors T3 are enabled.

The appropriate timing and selection of the groups of gate transistors T3 is accomplished by counter 43 and decoder 45. A timing control (not shown) provides a clock signal to counter 43 and the decoder 45 provides sequential output on the selector drive lines 47, the applied output being voltage $V_5$, to sequentially enable connected groups of gate transistors T3. For example, in the embodiment shown, the 6 bit binary counter 43 permits the sequential selection of some 64 selector drive lines 47 for application of $V_5$. With the presence of some 64 shift register elements 12 providing 64 data lines 41, there would be 4,096 transistors T3 and accompanying styli S, the product of the number of data lines 41 and selector drive lines 47.

In the readout mode, i.e., when the image bar is being used to read a document and send the information, for example, to another remote image bar, a logical "OR" gate function occurs on each data line 41. When a transistor T3 is biased into conduction, i.e., $V_5$ is high, the associated data line 41 follows the voltage $V_{G2}$ which is the amplified control signal for that photosensitive reading element portion 44. The transistors T3 are biased into conduction via the application of voltage $V_5$ on lines 47 from decoder 45. When data signals are being received via the gate transistors T3 from lines 40 to lines 41 for output, O/P ENABLE to shift register elements 12 will be set low and, therefore, $Z_0$ is at a high impedance. The data signals on lines 41 will be presented to the input of buffers 10. The buffered data signals are presented as input 39 to a respective register 11 in the shift register element 12 and sets the data input of the shift register 11. Data is loaded into the register by an enabling signal PARALLEL ENTRY ENABLE, and the video signals are shifted out by an enabling input signal SHIFT, permitting normal serial operation of the register elements 12. In other words, between each group selection of series gate transistors T3 at decoder 45, the data signals imputed to registers 11 are serially shifted out to SERIAL OUTPUT via the input SHIFT.

In the write-in mode, i.e., when the image bar is being used to write information received, for example, from another remote image bar, the stylus drive transistors T2 can be addressed via transistors T3. Transistors T2 are driven by a data signal provided via shift register latch 13 and tristate buffer 14. This is accomplished by selecting the appropriate group of series gate transistors T3 and enabling the low impedance state of the tristate buffer 14 by O/P ENABLE being high. Between each group selection of series gate transistors T3 at decoder 45, the data signals imputed via SERIAL INPUT to the registers 11 is serially shifted out to SERIAL OUTPUT via the input SHIFT. PARALLEL ENTRY ENABLE to the shift registers 11 is disabled during this mode, and the photosensitive circuit portion 44 is also disabled by switching $V_1$ to a low state or zero.

As already mentioned, the image bar may also be used in modes which combine copying with either writing or reading. Combining copying with writing allows electronic forms overlay and editing functions. Combining copying with reading allows output monitoring, giving a copy of transmitted documents. Harnessing several machines together allows simultaneous multiple copying with electronic collation.

Figure 6:
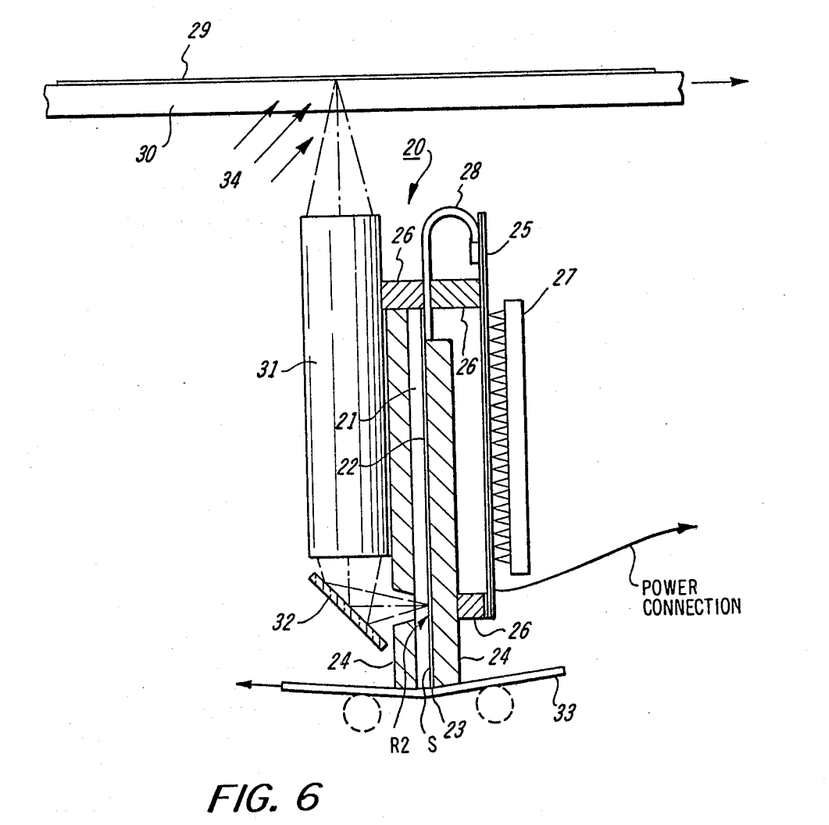
FIG. 6 is a side view of an integrated image bar according to this invention and arranged for copying and reproduction of an original document.

An example of an arrangement incorporating the layout of FIGS. 2-5 is shown enlarged in FIG. 6. The image bar 20 comprises a glass substrate 21 which carries the MOS/VLSI or thin film circuits 22 comprising circuit portions 42, 44 and 46. The stylus nibs 23 of the styli S are at the lower extremity of the thin film circuits 22. The glass substrate 21 and the thin film circuits 22 are encased in a potting material or support 24. Before encasement, the circuits 22 are covered with a passivating coating, e.g., polyimide, to protect the integrated circuits. A card 25 for peripheral circuits of FIG. 5 is secured to the support 24 by means of card support 26. The peripheral circuitry may be included, for example, in a forty-pin integrated circuit chip 27, with connections to the thin film circuits 22 being made by way of a flexible wiring harness 28. Alternatively, chip 27 may be bonded directly on substrate 21.

The photoresistors $R_2$ are located in a region on substrate 21 just above the styli S. A line image of a document 29 being copied is formed along the line of photoresistors $R_2$ with the use of the selfocus lens array 31. Document 29 is supported on a platen 30 and is illuminated by a light source 34. Source 34 may be a low power incandescent, fluorescent or xenon lamp. The strip lens array 31 forms the required line image on photoresistors $R_2$ by means of a plane mirror 32. In order to form a complete image of the document being copied, relative movement is provided between the document 29 and the image bar 20.

The electrical impulses supplied to the nibs 23 of styli S are used to form an image on the recording medium 33 which is passed under the nibs in contact with them and at the appropriate speed proportional to the speed of relative movement between the document 29 and the image bar 20. Any suitable form of recording may be used. Thus, the imaging medium 33 may record an image directly, by coloration of the sheet due to the action of the electrical impulses supplied by the stylus nibs, or it may record an electrostatic laten image on a dielectric coated medium for subsequent development by standard electrographic techniques. Alternatively, electrochromic marking techniques may be used, or the outputs may be used to operate ink jets or ion jets instead of the styli described above.

Figure 7:
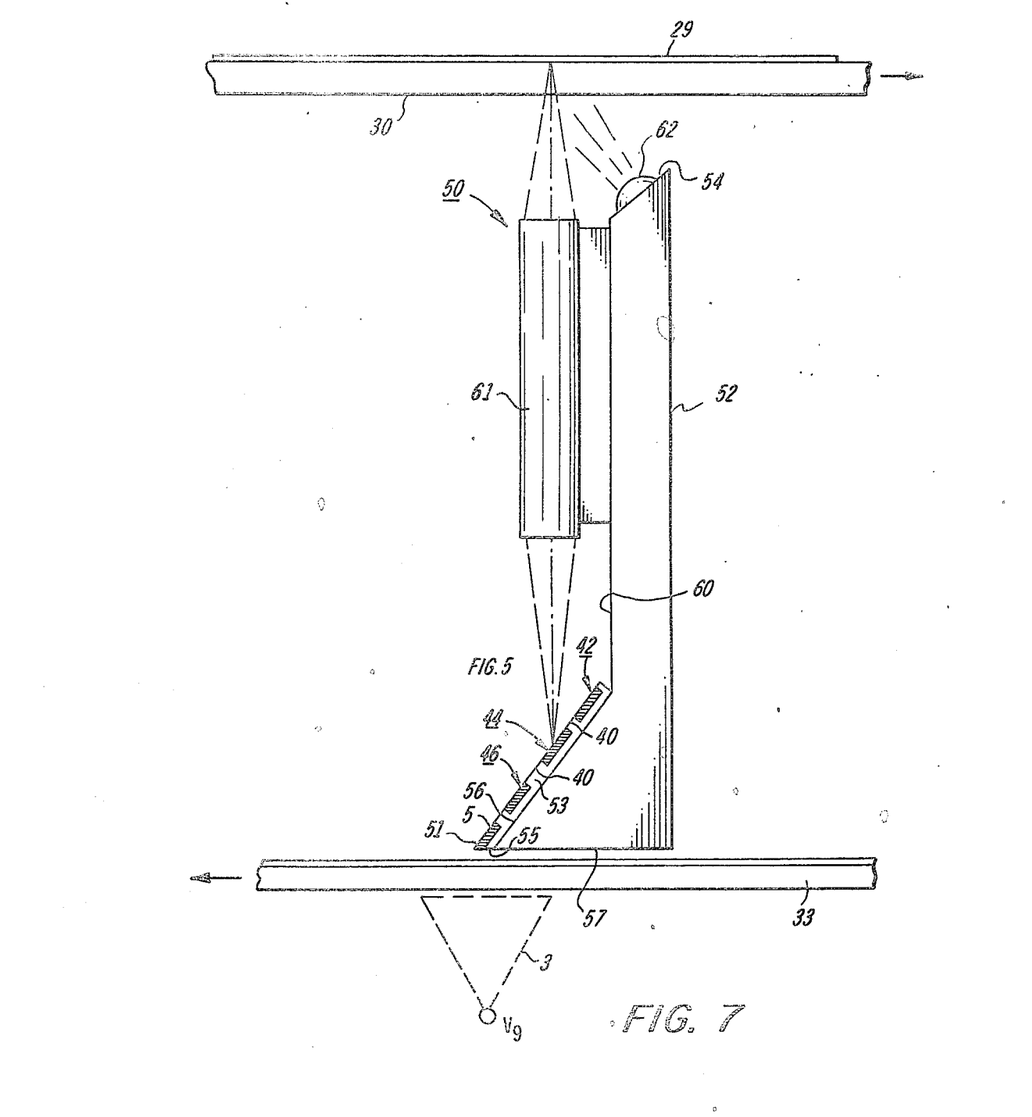
FIG. 7 is a side view of another embodiment of the integrated image bar according to this invention and arranged for copying and reproduction of an original document.

FIG. 7 shows an enlarged view of another embodiment for the integrated image bar according to this invention. Image bar 50 comprises a support member 52, e.g., insulating substrate, which may have a width equal to that of a document 29 to be read. Support member 52 features an upper oblique end 54 and an oblique or offset surface 56. The circuitry illustrated in FIG. 2 is formed by thin film or MOS/VLSI techniques in the regions designated in FIG. 7 for the circuit portions 42, 44 and 46 and for the FIG. 5 circuitry. This circuitry is formed on an appropriate substrate 53, e.g., silicon. Substrate 53 may comprise a plurality of coupled substrate components extending the full width of a document 29 or may comprise a single substrate component. The stylus, S, are formed along the lower edge of the substrate 53. The stylus S may be formed by conventional photolithography techniques to form metal electrodes, e.g., of copper or nickel. Alternatively, these stylus electrodes may be produced by first forming a $SiO_2$ layer on the surface region 58 where the stylus electrodes are to be formed. Next, polysilicon is deposited on the $SiO_2$ surface. This is followed with a selective etch to form the insulating regions separating and forming conducting lines constituting the individual styli S. Then, another insulating layer is formed over the preformed styli S.

The end surface 55 of substrate 53 is beveled to be flush with the end surface 57 of support member 52. This provides support for the substrate 53 and engagement or close encounter of the stylus nibs 51 with the passage of recording medium 33.

An array of selfocus lenses 61 is secured to surface 60 of support member 52 in a manner that the output of the lens array will be aligned and focused onto the array of photoresistors $R_2$ or photodiodes 7, as the case may be, in circuit portion 44 on substrate 53.

The upper edge of substrate may be provided with an illumination source 62, e.g., low power incandescent, fluorescent or xenon lamp.

The image bar 50 is completely self-contained for reading a document 29 and reproducing the document on recording medium 33, except for the power supply and possibly off chip clock source, e.g., quartz clock handling. However, clock handling circuitry may be provided on chip by known MOS/VLSI technology.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. In an integrated image bar having an integral image reading and writing section and including an optical assembly and an integrated circuit assembly formed in a support structure, said integrated circuit assembly including an array of aligned low voltage, photosensitive reading elements formed on a substrate adjacent one edge thereof, an array of aligned marking elements, one for each reading element, and arranged also along said one substrate edge with the ends of said elements extending to said substrate edge forming an array of recording styli, an integrated circuit interposed between each reading element and an associated marking element including amplifier means to provide a low voltage signal proportional to the exposure and change in impedance of an associated photosensitive reading element and operative to provide a comparatively high voltage to an associated stylus for writing.

2. The integrated image bar of claim 1 wherein said amplifier means in each of said circuits includes one or more thin film transistors.

3. The integrated image bar of claim 1 wherein said amplifier means includes two transistors, a first transistor comprising a low-voltage, high gain stage, and a second transistor comprising a high-voltage, lower gain stage.

4. The integrated image bar of claim 3 including a third transistor arranged to act as a bi-directional series gate for enabling externally generated signals to be supplied via said second transistor to an associated marking element along with said low voltage signal, and for enabling signals produced by an associated reading element and amplified by said first transistor to be supplied to external circuitry.

5. The integrated image bar of any one of claims 1 to 4 wherein said structure carries optical means for forming an image of a document to be copied onto said array of photosensitive reading elements.

6. A copying apparatus including a platen for supporting a document to be copied, illumination means for illuminating said document, an integrated image bar in accordance with claim 5, means for causing relative movement between said document platen and said image bar, and a recording medium arranged to cooperate with said recording styli to record an image of said document.

7. An integrated image bar having an intergal image reading and writing section and including an optical assembly and an integrated circuit assembly formed in a support structure, said circuit assembly formed on a substrate and including an array of aligned low voltage, photosensitive reading elements formed on said substrate adjacent one edge thereof, an array of aligned marking elements, one for each reading element, and arranged also along said one substrate edge with the ends of said elements extending to said substrate edge forming an array of recording styli, first circuit means included in said circuit assembly and coupled to each of said photosensitive reading elements to provide a low voltage drive signal output, the magnitude of which is proportional to radiation sensed by a photosensitive reading element, second circuit means included in said circuit assembly and coupled to said marking elements and said low voltage drive signal outputs selective of said drive signal outputs operative to cause selective of said second circuit means to provide a writing voltage at an associated stylus, said optical assembly comprising an array of self-focus lenses mounted in parallel but spaced relation to said integrated circuit assembly, the focal point of the array input to said lenses being across the width of a platen for reading a document and the focal point of the array output from said lenses being across the width of said photosensitive reading elements.

8. The integrated image bar of claim 7 wherein the array output from said lenses is folded by reflector means for exposure onto said array of photosensitive reading elements via said substrate and an aligned slot formed in said support structure.

9. The integrated image bar of claim 7 wherein there is provided a support member for said substrate, said support member having a transverse face, said substrate positioned on said transverse face so that the focal point of the array output from said lenses is axially aligned across the width of said substrate.

* * * * *